United States Patent
Lefaudeux et al.

(10) Patent No.: US 9,459,459 B2
(45) Date of Patent: Oct. 4, 2016

(54) METHODS AND DEVICES FOR CONTROLLING THE SIZE OF LIGHT BEAMS OF LARGE DIMENSIONS

(71) Applicant: Imagine Optics, Orsay (FR)

(72) Inventors: Nicolas Lefaudeux, Paris (FR); Xavier Levecq, Gif sur Yvette (FR)

(73) Assignee: IMAGINE OPTIC, Orsay (FR)

( * ) Notice: Subject to any disclaimer, the term of this patent is extended or adjusted under 35 U.S.C. 154(b) by 0 days.

(21) Appl. No.: 14/610,644

(22) Filed: Jan. 30, 2015

(65) Prior Publication Data

US 2015/0219904 A1    Aug. 6, 2015

(30) Foreign Application Priority Data

Jan. 31, 2014   (FR) ...................... 14 50779

(51) Int. Cl.
| | |
|---|---|
| G02B 27/14 | (2006.01) |
| G02B 27/10 | (2006.01) |
| G02B 27/09 | (2006.01) |
| G01M 11/00 | (2006.01) |
| G01J 1/04 | (2006.01) |
| G01J 9/00 | (2006.01) |
| G02B 23/06 | (2006.01) |

(52) U.S. Cl.
CPC .......... *G02B 27/0983* (2013.01); *G01J 1/0411* (2013.01); *G01M 11/005* (2013.01); *G02B 27/09* (2013.01); *G02B 27/108* (2013.01); *G01J 2009/002* (2013.01); *G02B 23/06* (2013.01)

(58) Field of Classification Search
USPC ................................................ 359/270–280
See application file for complete search history.

(56) References Cited

U.S. PATENT DOCUMENTS

| | | | | |
|---|---|---|---|---|
| 4,693,604 A | * | 9/1987 | Tenjinbayashi | ...... G01M 11/005 356/458 |
| 4,958,931 A | | 9/1990 | Tatian | |
| 5,973,841 A | * | 10/1999 | Watanabe | ............ H04N 5/7441 348/E5.141 |
| 6,710,909 B2 | * | 3/2004 | Naito | ................. G02B 26/0841 348/E5.142 |

FOREIGN PATENT DOCUMENTS

| | | |
|---|---|---|
| EP | 0750891 A1 | 1/1997 |
| WO | 96/36898 A2 | 11/1996 |

OTHER PUBLICATIONS

Preliminary Search Report issued in corresponding French Patent Application No. 1450779 dated Oct. 2, 2014 (2 pages).

(Continued)

*Primary Examiner* — Mohammed Hasan
(74) *Attorney, Agent, or Firm* — Osha Liang LLP

(57) ABSTRACT

Methods and devices for reducing the dimensions of an incident light beam of large dimensions are disclosed. The method includes the dispatching of a first light beam toward a partially reflecting plate of dimensions suitable for the dimensions of the light beam of large dimensions, the dispatching onto a convergent reflective element of a second light beam arising from the transmission through the partially reflecting plate of the first light beam, the dispatching of a third light beam arising from the reflection on the convergent reflective element of the second light beam, toward said partially reflecting plate, and the reflection of the third beam on the partially reflecting plate so as to form a fourth light beam.

10 Claims, 3 Drawing Sheets

(56) References Cited

OTHER PUBLICATIONS

I. Lazareva et al, (2010). Highly sensitive wave front sensor for visual inspection of bare and patterned silicon wafers. Optical Micro and Nanometrology III, SPIE, vol. 7718, p. 77181H-1, XP040536662 (9 pages), January.

B Dörband et al. (2012). Non-interferometric Wavefront Sensing. Handbook of Optical Systems, p. 188, XP055143875 (1 page), January.

* cited by examiner

METHODS AND DEVICES FOR CONTROLLING THE SIZE OF LIGHT BEAMS OF LARGE DIMENSIONS

PRIOR ART

1. Technical Field

The present description relates to methods and devices for controlling the size of light beams of large dimensions, and applies in particular to the diagnosis of light beams of large dimensions and to the optical control of optical elements of large dimensions.

2. Prior Art

The characterization of laser beams of large dimensions (typically >100 mm in diameter), whether it be to estimate the quality of the phase of a laser beam or for the optical control of optical systems of large dimensions, requires specific optics in order to reduce the size of the beams so as to adapt them to suit the diagnosis apparatuses.

The use of standard lenses is generally no longer possible for these sizes of beams. It is then necessary to resort to mirror systems with similar architecture to that of telescopes used for astronomy or to off-axis parabolic mirrors. The mirror telescopes used for astronomy are associated with a central obstruction which occults a part of the beam which cannot then be measured.

Systems of off-axis parabolic mirror type as described for example in the article by I. Lazareva et al. ("Highly sensitive wave front sensor for visual inspection of bare and patterned silicon wafers", SPIE, vol. 7718, page 77181H-1 (2010)) do not have any central obstruction but the technical difficulty in producing this off-axis aspherical element is generally associated with a much higher cost than that of a system of telescope type. Furthermore, these systems exhibit difficulties of alignment for the user.

Moreover, the laser beam after reduction is in most cases much too intense to be able to be dispatched as is onto the diagnosis systems, and it is necessary to resort to attenuation means like sets of very opaque optical densities making it possible to decrease the intensity of the beam by typical factors of from $10^4$ to more than $10^9$. Moreover, experience shows that these sets of very opaque densities are a source of danger for the diagnosis systems which may be damaged by the laser if the user switches inadvertently from a very high density to a much lower density.

The present description proposes systems and processes for controlling the size of beams of large dimensions making it possible to alleviate the aforementioned drawbacks.

SUMMARY

According to a first aspect, the present description relates to methods for reducing the dimensions of an incident light beam of large dimensions, without central obstruction.

In the present description the expression light beams of large dimensions is understood to mean light beams of diameter greater than about 100 mm.

According to one or more embodiments, the method according to the present description comprises the dispatching of a first collimated light beam, of large dimensions, toward a partially reflecting plate of dimensions suitable for the dimensions of the light beam of large dimensions; the dispatching onto a convergent reflective element of a second light beam arising from the reflection on the partially reflecting plate or from the transmission through the partially reflecting plate, of the first light beam; the dispatching of a third light beam arising from the reflection on the reflective element of the second light beam, toward said partially reflecting plate; the transmission of the third beam through the partially reflecting plate when the second beam arises from the reflection on the partially reflecting plate, or the reflection of the third beam on the partially reflecting plate when the second beam arises from the transmission through the partially reflecting plate, so as to form a fourth light beam.

The method thus described makes it possible to control the size of the incident beam without central obstruction thereof, with moreover a controlled attenuation of the incident beam, said attenuation being fixed in particular by the product of the transmission and reflection coefficients of the partially reflecting plate.

According to one or more exemplary embodiments, the attenuation resulting from all the transmissions and reflections through the semi-reflecting plate and from the reflection on the reflective element is greater than 4. As a function of the applications sought, and in particular in the case of the use of lasers of high power, more significant attenuations can be sought, for example greater than $10^2$, or indeed greater than $10^4$ thus making it possible to limit the use of very opaque optical densities.

According to one or more exemplary embodiments, the method furthermore comprises the dispatching of the fourth light beam toward a diagnosis module and applies to the reduction in the size of incident light beams of large size for applications for diagnosing the light beams of large dimensions.

According to one or more exemplary embodiments, the first collimated light beam of large dimensions arises from the reflection of an incident beam by an optical system to be controlled, or from the transmission of an incident beam through an optical system to be controlled. For example, the first beam arises from the reflection of an incident beam on the optical system to be controlled, for example a mirror. The method thus applies to the optical control of optical systems of large dimensions.

The methods described allow the use of "on-axis" convergent reflective elements, that is to say of reflective elements whose shape exhibits a symmetry of revolution, without central obstruction, for example parabolic or spherical mirrors, which exhibit the advantage of being achromatic. In these elements, the optical axis coincides with the axis of symmetry.

According to a second aspect, the present description relates to devices for the implementation of the methods according to the first aspect.

The device according to one or more examples of the present description comprises in particular a partially reflecting plate of dimensions suitable for the dimensions of a light beam of large dimensions, and intended to receive a first collimated light beam of large dimensions, and a convergent reflective element intended to receive a second light beam arising from the reflection on the partially reflecting plate or from the transmission through the partially reflecting plate of the first light beam, and to return toward the partially reflecting plate a third light beam arising from the reflection of the second beam by the convergent reflective element so as to form a fourth light beam.

According to one or more exemplary embodiments, the convergent reflective element is an on-axis convergent mirror, for example an on-axis parabolic mirror.

According to one or more exemplary embodiments, the partially reflecting plate is for example a plate with plane and parallel faces coated with a suitable optical treatment.

According to one or more exemplary embodiments, the device furthermore comprises a diagnosis module intended to receive the fourth light beam.

According to one or more exemplary embodiments, the diagnosis module comprises a wave surface analysis module and/or a spectral analysis module and/or a phase analysis module.

BRIEF DESCRIPTION OF THE DRAWINGS

Other advantages and characteristics of the invention will appear on reading the description, illustrated by the following figures which represent.

For the sake of consistency, identical elements are tagged by the same references in the various figures.

DETAILED DESCRIPTION

Figure 1A:
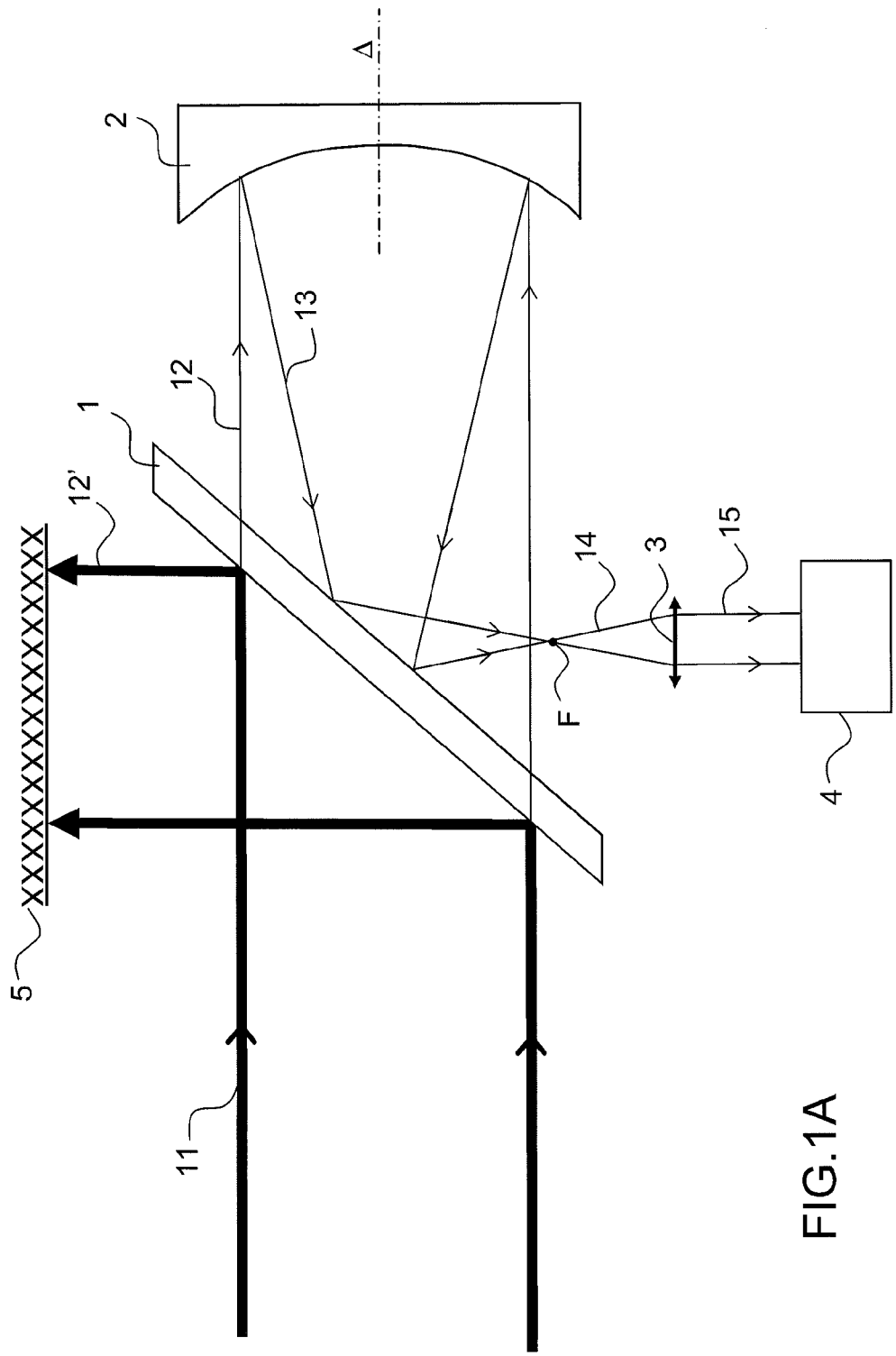
FIG. 1A, a diagram illustrating an exemplary device for controlling the size of a beam of large dimensions according to the present description, applied to laser beam diagnosis, in which an incident beam of large dimensions is transmitted and then reflected by a partially reflecting plate.

FIG. 1A presents a first exemplary device according to the present description, for the implementation of a method for reducing the dimensions of an incident light beam of large dimensions, in particular for diagnosis purposes. The method applies more particularly to beams with high spatial coherence, for example to laser beams of large dimensions, in particular to laser beams of high energy or of high optical power.

The device comprises in this example a partially reflecting plate 1 of dimensions suitable for the dimensions of an incident light beam 11 to be diagnosed ("first beam") and a convergent reflective element 2 intended to receive the light beam 12 ("second beam") arising in this example from the transmission of the light beam 11 on the partially reflecting plate 1.

The light beam to be diagnosed 11 is a collimated beam, of large dimensions, that is to say of diameter greater than about 100 mm. According to an example, it arises directly from a laser source; according to another example, it arises from reflection on an optical system (not represented in FIG. 1A) that it is sought to control.

In this example, the partially reflecting plate is for example a plate with plane and parallel faces, for example a glass plate, endowed with a semi-reflecting optical treatment, which treatment may for example comprise a metallic or dielectric coating.

The convergent reflective element is advantageously a convergent mirror, for example a parabolic mirror with symmetry of revolution, or "on axis" as it is referred to; according to this variant, the axis of the parabolic mirror is parallel to the optical axis Δ of the second beam 12 and the system is then nominally stigmatic. According to a variant, the parabolic mirror can be replaced with a spherical mirror. The system is then no longer nominally stigmatic and exhibits aberrations. The latter can be ignored or else compensated by one or more other optical elements, or else calibrated according to the application considered.

The beam 12' arising from the reflection of the first beam 11 on the partially reflecting plate is not necessarily used; according to an exemplary embodiment, it is dispatched toward an element 5 aimed at stopping the beam. According to another exemplary embodiment, it can be used to carry out a complementary diagnosis or it forms a laser beam intended to be used for any other application.

The beam 13 arising from the reflection of the second beam 12 on the parabolic mirror 2 ("third beam") is a convergent beam, for example a convergent beam toward the focal point F of the parabolic mirror 2. The third beam 13 is reflected on the partially reflecting plate 1 so as to form a fourth beam 14 which can be picked up according to an example by an optic 3 so as to form a collimated light beam of very reduced dimensions with respect to the first beam 11, and attenuated, with a view to its diagnosis on a diagnosis module 4.

For example, and in a known manner, the diagnosis module 4 can comprise a wave surface analysis module, a spectral analysis module, a phase analysis module, etc.

The attenuation of the first beam results in this example from the various transits of the beams in transmission and in reflection through and on the partially reflecting plate 1, as well as from reflection on the parabolic mirror 2.

According to an example, the attenuation resulting from all the transmissions and reflections through the semi-reflecting plate and from the reflection on the reflective element is greater than 4. In applications where larger attenuations are sought, for example applications involving lasers of high power (hundreds of terawatts or more), the attenuation resulting from all the transmissions and reflections through the semi-reflecting plate and from the reflection on the reflective element may be greater than 10000.

Thus for example in the case of a semi-reflecting treatment of the plate with reflection and transmission coefficients of 50%, the overall transmission of the system is less than 25%. In the case of a reflecting treatment of the plate ensuring a transmission of $1/10000$ and high reflection (close to 1), the overall transmission of the system is then less than $1/10000$.

The device described in FIG. 1A and suitable for the diagnosis of beams of large dimensions is based on the use of an "on-axis" mirror, it is therefore intrinsically of good optical quality, achromatic, and does not exhibit any central obstruction as is the case in telescopes. Moreover, the attenuation resulting from the multiple transits in transmission or in reflection on the partially reflecting plate as well as from the reflection on the parabolic mirror makes it possible to achieve perfectly controlled attenuations without however requiring the use of a set of very opaque densities, thereby allowing increased safety for the diagnosis apparatuses.

The device described in FIG. 1 furthermore advantageously comprises means of alignment (not represented in FIG. 1A) of the parabolic mirror 2 and of the partially reflecting plate 1.

Figure 1B:
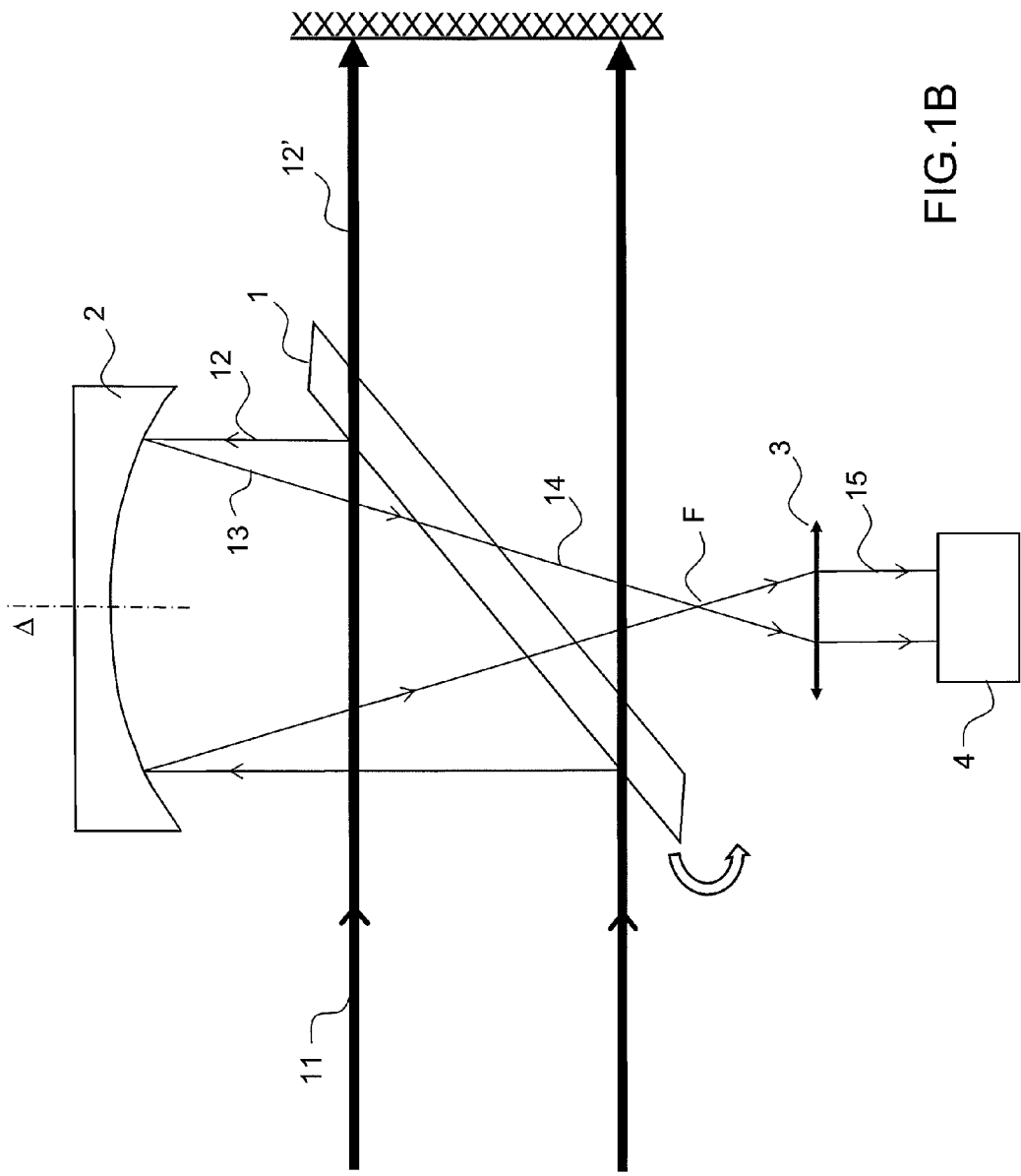
FIG. 1B, a diagram illustrating a variant of the diagram illustrated in FIG. 1A, in which the incident beam is reflected and then transmitted by the partially reflecting plate.

The device represented in FIG. 1B is a variant of the device described in FIG. 1A, in which the semi-reflecting plate is used the first time in reflection and then in transmission. In this example, the light beam 12' not used is the beam arising from the transmission of the first beam 11 (incident beam).

However, for reasons of optical quality, the variant of FIG. 1A will be preferred, in which the beam of small dimension is reflected and the beam of large dimension transmitted.

Figure 2:
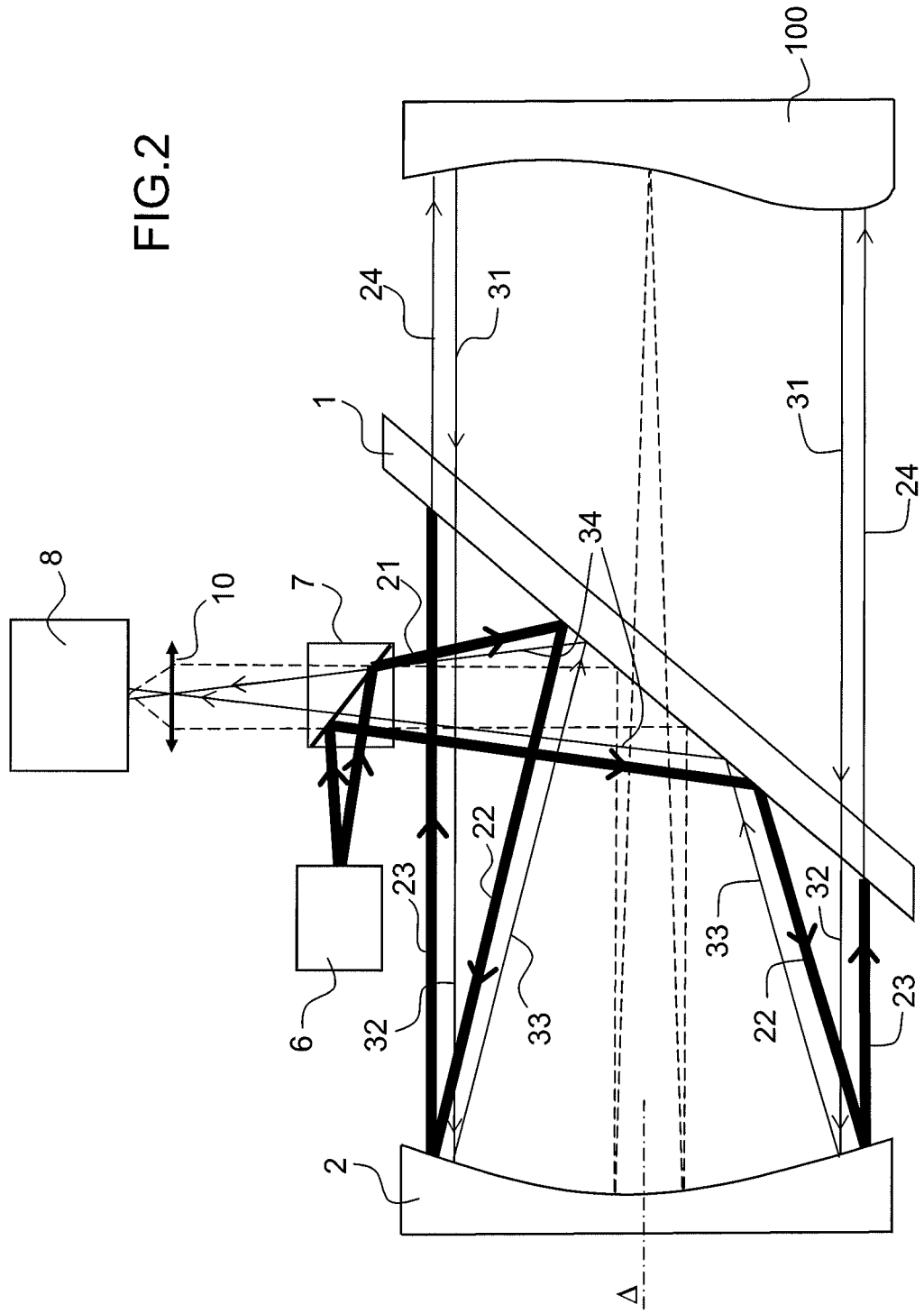
FIG. 2, a diagram illustrating an exemplary device for controlling the size of a beam of large dimensions according to the present description, applied to the optical control of optical elements of large dimensions.

FIG. 2 presents a second exemplary device according to the present description, suitable for the optical control of an optical element 100 of large dimensions, or more generally of an optical system.

As in the example of FIG. 1A, the device represented in FIG. 2 comprises a partially reflecting plate 1 and a convergent reflective element 2, for example an "on-axis" parabolic mirror. After reflection on the optical system to be controlled 100, a first incident beam 31 is transmitted through the partially reflecting plate 1 (beam 32), reflected by the parabolic mirror (beam 33), reflected by the partially reflecting plate 1 to form a convergent beam 34 dispatched onto a diagnosis module 8, for example a wave surface analysis module.

In the example of FIG. 2, the device furthermore comprises a source 6 for emitting a divergent light beam 21, the partially reflecting plate 1 and the convergent reflective element 2 being arranged so as to form on the basis of the divergent beam 21 a collimated beam of large dimensions, incident on the optical system 100 to be controlled. Typically, the collimated beam thus formed will be able to have a diameter of greater than 100 mm, or indeed of greater than several hundred millimeters.

The source is for example a source of high spatial coherence, fibered or non-fibered, for example a laser diode or a fibered laser diode. The divergent beam 21 arising from the source 6 is dispatched toward the partially reflecting plate 1. The beam 22 arising for example from the reflection of the beam 21 on the partially reflecting plate 1 is dispatched toward the parabolic mirror 2, the axis of the parabolic mirror being parallel to the optical axis Δ of the beam 22. A collimated beam 23, whose dimensions depend on the characteristics of the parabolic mirror 2, is thus obtained after reflection on the parabolic mirror 2.

It is possible in this example to also work with a divergent beam arising from the source 6 and transmitted by the partially reflecting plate 1, the beam reflected by the parabolic mirror 2 being thereafter reflected by the partially reflecting plate 1. However, for reasons of optical quality, it will be preferred to reflect a beam of small dimension and to transmit a beam of large dimension.

The device described in FIG. 2 furthermore advantageously comprises means of alignment (not represented in FIG. 2) of the parabolic mirror 2 and of the partially reflecting plate 1.

In this example, the partially reflecting plate is advantageously a semi-reflecting plate exhibiting a reflection of close to 50% and a transmission of close to 50% so as to maximize the optical intensity of the beam of large dimensions at the output of the device.

Advantageously in the example represented in FIG. 2, an optic 10 makes it possible to ensure the conjugation of the plane of detection of the diagnosis module 8 and of the pupillary plane of the optical system 100 to be controlled; in FIG. 2, the conjugation is indicated by short dashes.

Advantageously in the example represented in FIG. 2, a splitter element 7 makes it possible to split the optical pathways of the divergent beam 21 arising from the luminous source 6 and from the convergent beam 34 arising from the reflection on the partially reflecting plate.

Here again, the system thus described is intrinsically of good optical quality, achromatic, and does not exhibit any central obstruction, allowing reliable control of optics of large diameters, such as for example mirrors.

Although described through a certain number of exemplary embodiments, the methods and devices for controlling the size of light beams of large dimensions comprise different variants, modifications and enhancements which will be apparent in an obvious manner to the person skilled in the art, it being understood that these different variants, modifications and enhancements form part of the scope of the invention as defined by the claims which follow.

The invention claimed is:

1. A method for reducing the dimensions of an incident light beam of large dimensions, comprising:
    dispatching of a first collimated light beam, of large dimensions, toward a partially reflecting plate of dimensions suitable for the dimensions of the light beam of large dimensions;
    dispatching onto a convergent reflective element of a second light beam arising from the reflection on the partially reflecting plate or from the transmission through the partially reflecting plate, of the first light beam;
    dispatching of a third light beam arising from the reflection on the convergent reflective element of the second light beam, toward said partially reflecting plate; and
    transmission of the third beam through the partially reflecting plate when the second beam arises from the reflection on the partially reflecting plate, or the reflection of the third beam on the partially reflecting plate when the second beam arises from the transmission through the partially reflecting plate, so as to form a fourth light beam.

2. The method as claimed in claim 1, wherein the method is suitable for the diagnosis of light beams of large dimensions, the method further comprising dispatching of the fourth light beam toward a diagnosis module.

3. The method as claimed in claim 1, wherein the method is suitable for the control of an optical system of large dimensions, in which the first collimated light beam of large dimensions arises from the reflection of an incident beam by said optical system or from the transmission of an incident beam by said optical system.

4. The method as claimed in claim 3, further comprising dispatching of the fourth light beam toward a diagnosis module.

5. The method as claimed in claim 3, further comprising:
    dispatching of a divergent light beam arising from a luminous source toward the partially reflecting plate;
    dispatching onto the convergent reflective element of the light beam arising from the reflection on the partially reflecting plate or from the transmission through the partially reflecting plate, of the divergent light beam; and
    dispatching of the beam reflected by the convergent reflective element toward the partially reflecting plate and the transmission or the reflection of said beam reflected by said partially reflecting plate so as to form a collimated light beam, of large dimensions, incident on the optical system.

6. The method as claimed in claim 4, further comprising the conjugation of a plane of detection of the diagnosis module with a pupillary plane of the optical system to be controlled.

7. An optical device for the implementation of a method as claimed in claim 1, comprising:

a partially reflecting plate of dimensions suitable for the dimensions of a light beam of large dimensions, and intended to receive a first collimated light beam, of large dimensions; and a convergent reflective element configured to receive a second light beam arising from the reflection on the partially reflecting plate or from the transmission through the partially reflecting plate of the first light beam, and to return toward the partially reflecting plate the third light beam arising from the reflection of the second beam by the convergent reflective element so as to form a fourth light beam.

8. The optical device as claimed in claim 7, in which the convergent reflective element is an on-axis parabolic mirror.

9. The optical device as claimed in claim 7, further comprising a diagnosis module intended to receive the fourth light beam.

10. The optical device as claimed in claim 9, in which the diagnosis module comprises a wave surface analysis module and/or a spectral analysis module and/or a phase analysis module.

\* \* \* \* \*